United States Patent
Tedder et al.

(10) Patent No.: US 10,495,409 B2
(45) Date of Patent: Dec. 3, 2019

(54) MOUNTING DOCK

(71) Applicant: Tedder Industries, LLC, Post Falls, ID (US)

(72) Inventors: Thomas Tedder, Post Falls, ID (US); Jacob Shearer, Post Falls, ID (US)

(*) Notice: Subject to any disclaimer, the term of this patent is extended or adjusted under 35 U.S.C. 154(b) by 231 days.

(21) Appl. No.: 15/817,167

(22) Filed: Nov. 18, 2017

(65) Prior Publication Data

US 2018/0142989 A1    May 24, 2018

Related U.S. Application Data

(60) Provisional application No. 62/424,219, filed on Nov. 18, 2016.

(51) Int. Cl.
| | |
|---|---|
| F41C 33/04 | (2006.01) |
| F41C 33/02 | (2006.01) |
| B60R 7/14 | (2006.01) |
| F16M 13/02 | (2006.01) |
| F16B 2/06 | (2006.01) |
| F16B 2/12 | (2006.01) |

(52) U.S. Cl.
CPC ............. *F41C 33/041* (2013.01); *B60R 7/14* (2013.01); *F16B 2/06* (2013.01); *F16M 13/02* (2013.01); *F16B 2/12* (2013.01); *F41C 33/02* (2013.01)

(58) Field of Classification Search
CPC . F41C 33/041; B60R 7/14; F16B 2/06; F16M 13/02
See application file for complete search history.

(56) References Cited

U.S. PATENT DOCUMENTS

| | | | | |
|---|---|---|---|---|
| 5,114,095 A | * | 5/1992 | Schroppel | F42B 10/20 244/3.28 |
| 5,825,874 A | * | 10/1998 | Humphreys | B60R 11/0241 379/446 |
| 6,002,921 A | * | 12/1999 | Pfahlert | B60R 11/0241 455/420 |
| 6,848,662 B2 | * | 2/2005 | Paramonoff | E05C 3/14 248/222.11 |
| 8,104,731 B2 | * | 1/2012 | Faucher | F16B 37/045 104/89 |
| 2002/0158095 A1 | * | 10/2002 | Vor Keller | E05B 47/0603 224/244 |
| 2016/0084434 A1 | * | 3/2016 | Janway | A61M 5/16813 361/601 |

\* cited by examiner

*Primary Examiner* — Tan Le
(74) *Attorney, Agent, or Firm* — Timberline Patent Law Group

(57) ABSTRACT

Representative implementations of devices and techniques provide a mounting dock to receive and to support an implement (such as a handgun, for example) or a carrier (such as a handgun holster, for example). The dock includes a cradle arranged to receive and to support the carrier. One or more spring-loaded lock buttons are disposed within the cradle and arranged to be activated when the carrier is pressed into the cradle. One or more spring-loaded latching fins are movably coupled to the cradle and arranged to catch the carrier when the one or more lock buttons are activated.

18 Claims, 7 Drawing Sheets

MOUNTING DOCK

PRIORITY CLAIM AND CROSS-REFERENCE TO RELATED APPLICATION

This application claims the benefit under 35 U.S.C. § 119(e)(1) of U.S. Provisional Application No. 62/424,219, filed Nov. 18, 2016, which is hereby incorporated by reference in its entirety.

BACKGROUND

Implements, such as tools, weapons, and the like, may be temporarily encased in a carrier (such as a holster, for instance) for protection of the implement and/or the user, while providing access to the implement. For example, a carrier may allow a user to conveniently carry the implement, safely retaining the implement until needed. When the implement is to be used, the user may withdraw the implement from the carrier, and then return it to the carrier when finished. In some cases, such as with a handgun for example, the holster may allow the user to conceal the implement, or to conceal the fact that the user is carrying the implement.

However, it may not be desirable for the user to wear the implement and holster at all times. For example, it may be desirable to move the implement and holster from a worn position on the user to a temporary location not on the user's person for a time (such as when driving an automobile, sitting at a desk, sleeping in a bed, etc.), and still have ready and convenient access to the implement.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Figure 1:
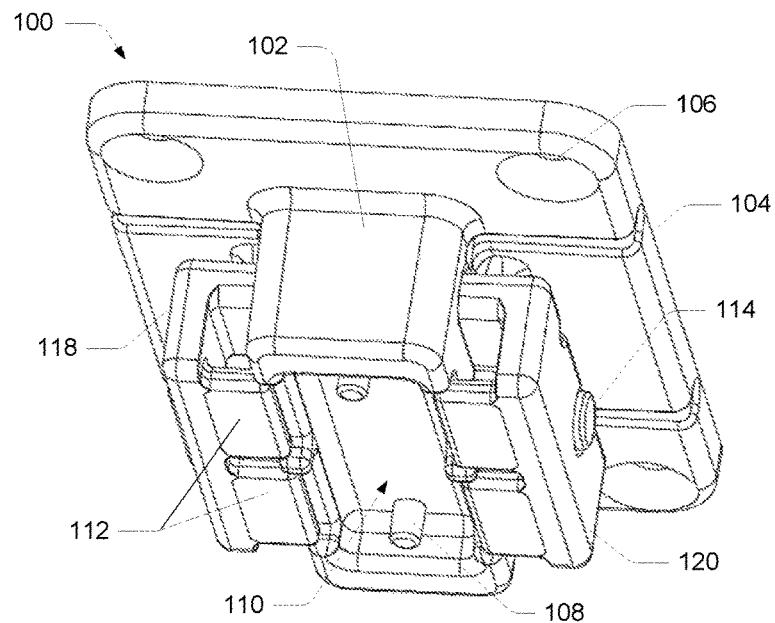
FIG. 1 shows a bottom perspective view of an example mounting dock, in an unlocked configuration, according to an implementation.

Representative implementations of devices and techniques provide a mounting dock to receive and to support an implement (such as a handgun, for example) or an implement holster (such as a handgun holster, for example). The dock is arranged to be mounted in various locations for temporarily and safely stowing the implement, while making the implement easily accessible to the user. For example, the dock may be mounted to a convenient surface, such as on a wall, within a vehicle, on a portion of a desk or other furniture, on a bedframe, or the like, either within view or concealed from view. The dock may be removed from one location and mounted to another location if desired, or multiple docks may be used in various locations by a user.

In various implementations, the user can remove the implement or implement holster from their person, and mount the implement or implement holster to the dock for temporary storage with easy access. For example, when preparing to use a vehicle, the user may remove a holster from a location on the user's person, and mount the holster to the dock located inside the vehicle. The dock may be coupled to the vehicle in a convenient location, within easy reach of the user while in the vehicle. The user can easily and quickly dismount the implement or implement holster from the dock and place it on their person when desired (such as when leaving the vehicle). Alternately, the user can withdraw the implement from the holster for use while the holster remains mounted to the dock. The implement may be returned to the holster while the holster is mounted to the dock.

Techniques and devices are discussed with reference to example handgun holsters illustrated in the figures. However, this is not intended to be limiting, and is for ease of discussion and illustrative convenience. The techniques and devices discussed may be applied to a holster or to any of various cases, carriers, containers, implements, tools, objects, and the like, and remain within the scope of the disclosure. For the purposes of this disclosure, the generic term "carrier" is used to indicate any or all of the above.

Further, the shape and quantity of the dock components illustrated in the figures may vary to accommodate the various objects to be docked, as well as to accommodate various applications. In alternate embodiments, fewer, additional, or alternate components may be used and/or combined to form a mounting dock having an equivalent function and operation.

Implementations are explained in more detail below using a plurality of examples. Although various implementations and examples are discussed here and below, further implementations and examples may be possible by combining the features and elements of individual implementations and examples.

Example Dock

An example mounting dock ("dock") 100, as shown in FIGS. 1-10, allows for a carrier (such as an implement or an implement holster, for example) to be mounted to a wall or other surface using a feature, such as a latch 702, for example, provided on the carrier. In various implementations, a mounting dock 100 includes a cradle 102 arranged to receive and to support the carrier and a base 104 arranged to temporarily or permanently attach the dock 100 to a convenient surface (e.g., wall, vehicle console, desk, bed, etc.), as desired, using one or more mounting holes 106 in the base 104 and permanent or temporary fasteners.

Referring to FIGS. 1-10, in various embodiments, once the base 104 is attached to a desired surface, the carrier can be mounted to the dock 100 by pushing the carrier into the cradle 102 of the dock 100. As the carrier is pushed into the cradle 102, a feature, such as the latch device 702, or the like, on the carrier is pressed against one or more lock buttons 108 protruding from the cradle 102 and into the cavity 110. When the lock buttons 108 are pushed in, one or more spring-loaded latching fins 112 collapse onto the carrier feature (e.g., latch device 702), and inserts into one or more recesses or openings 704 in the carrier feature (e.g., latch device 702). The latch fins 112 engage the carrier feature (e.g., latch device 702) and hold the carrier to the dock 100 until the carrier is intentionally released by a user. The latching fins 112 hold the carrier securely in place on the dock 100, regardless of the orientation of the dock 100.

The carrier can be released from the dock by pressing the release buttons 114 and 116. Pressing the release buttons 114 and 116 moves the latching fins 112 outward, and away from the carrier feature (e.g., latch device 702), releasing the carrier. The carrier can then be taken out of the cradle 102. The spring-loaded lock buttons 108 move back into the cavity 110 of the cradle 102 when the latching fins 112 are moved outward. Based on the shape of the lock buttons 108, the latching fins 112 are held in the open configuration until the lock buttons 108 are pressed again.

Referring to FIGS. 1, 2, 5, 7, and 8, an example mounting dock 100 is shown in an open configuration. The latching fins 112 are held (in tension) in the open position by the position of the lock buttons 108. In the open position, the latching fins 112 are clear of the cavity 110, to allow room for the carrier feature (e.g., latch device 702) on the carrier to enter the cavity 110. The lock buttons 108 are in the extended position, extending into the cavity 110 of the cradle 102.

In an embodiment, as shown in the illustrations, the latching fins 112 are integral to (or coupled to) a pair of spring-loaded clamps 118 and 120 movably coupled to either side of the cradle 102. In an embodiment, the latching fins 112 extend from the clamps 118 and 120 toward the cavity 110 of the cradle 102. The clamps 118 and 120 are held in the open position by the lock buttons 108, and thus, the latching fins 112 are also held in the open position when the lock buttons 108 are in the open configuration.

Figure 2:
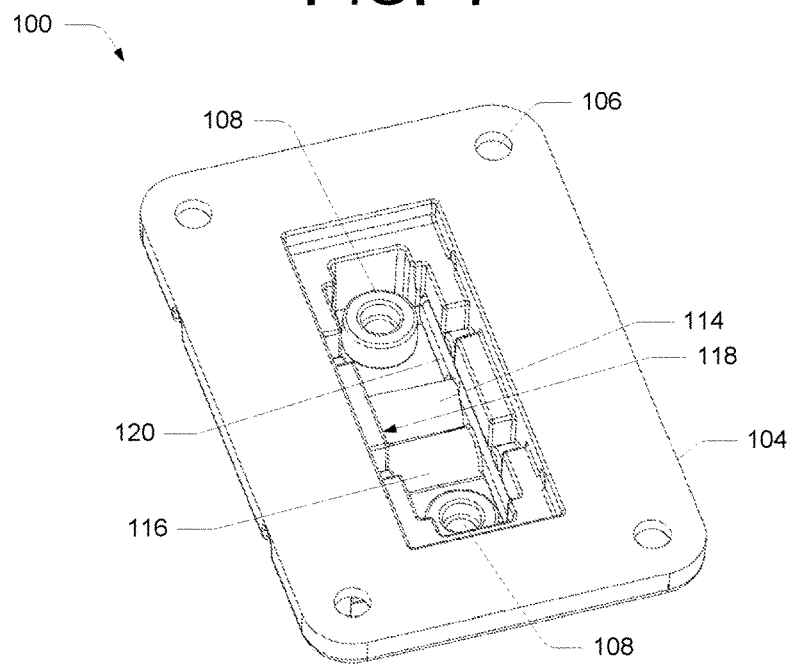
FIG. 2 shows a top perspective view of the example mounting dock of FIG. 1, in the unlocked configuration, according to an implementation.
Figure 5:
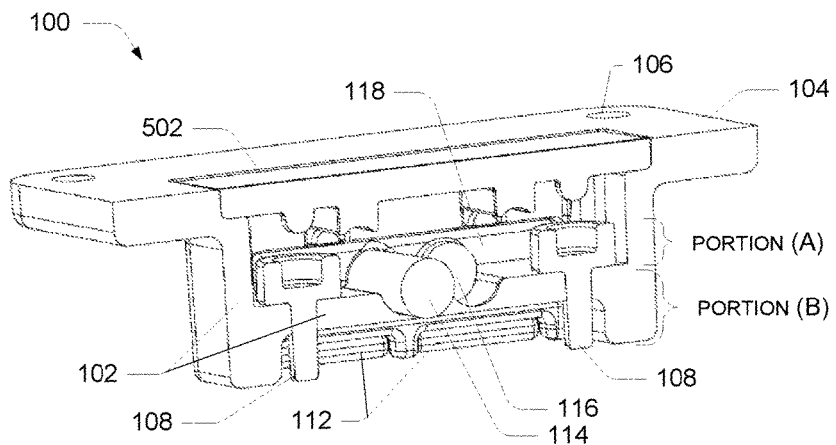
FIG. 5 shows a side section view of the example mounting dock of FIG. 1, in the unlocked configuration, according to an implementation.
Figure 8:
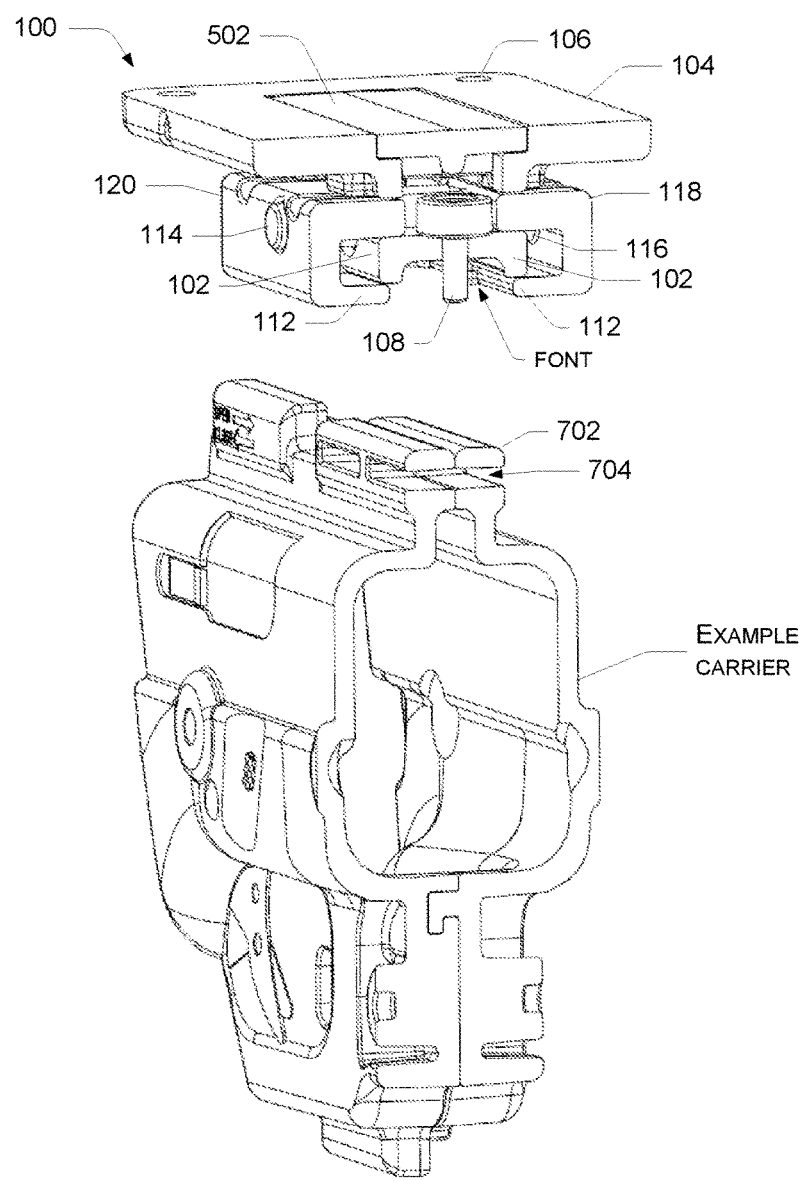
FIG. 8 shows a back perspective view of an example carrier aligned to be docked with an example mounting dock, according to an embodiment.

For example, as shown in FIGS. 5, 6, 8, and 10, in various embodiments, the lock buttons 108 may include a larger diameter portion at the top end of the lock buttons 108 (indicated in FIG. 5 as "portion (A)"), with a smaller diameter lower portion or post (indicated in FIG. 5 as "portion (B)") extending through an opening in the cradle 102 and into the cavity 110. In the open position, the lock buttons 108 are held down in the extended position by a spring device (not shown). In the extended position, as shown in FIGS. 2, 5, and 8, the larger diameter portion of the lock buttons 108 is wedged between the clamps 118 and 120, holding the clamps 118 and 120 apart. With the latching fins 112 locked in the open position, and the lock buttons 108 in the lower position, the dock 100 is ready for a carrier to be inserted into the dock 100.

When the lock buttons 108 are pressed (from within the cavity 110) the lock buttons are recessed into the cradle 102, and the larger portion of the lock buttons 108 is forced out from between the clamps 118 and 120. The spring-loaded clamps close in on the smaller post portion of the lock buttons 108, causing the latching fins 112 to close in on the cavity 110 toward each other. The latching fins 112 close on the latch 702, engaging the latch 702, when the latch 702 is positioned in the cavity 110 of the cradle 102.

Figure 4:
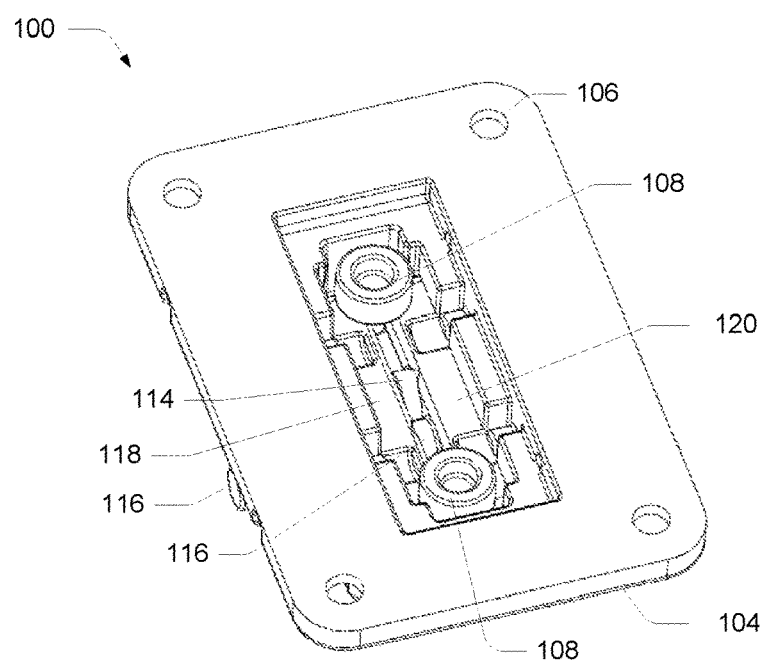
FIG. 4 shows a top perspective view of the example mounting dock of FIG. 1, in the locked configuration, according to an implementation.
Figure 7:
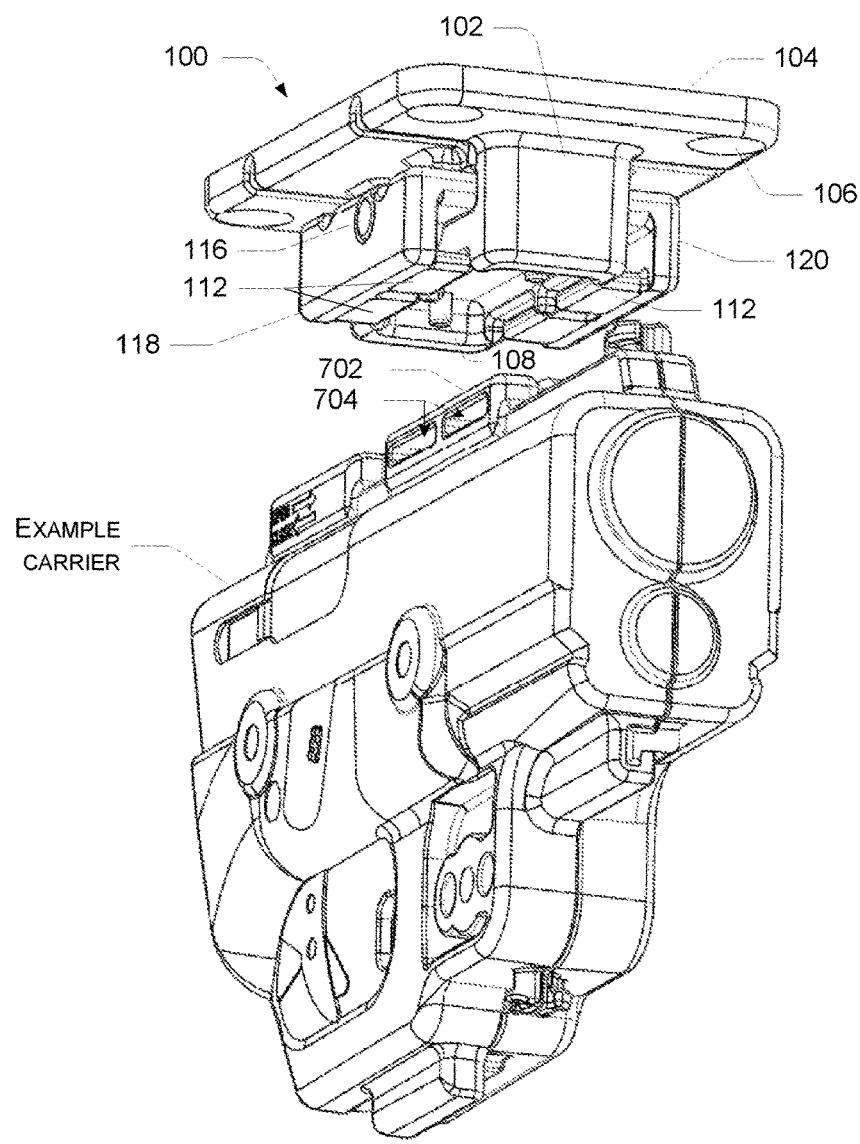
FIG. 7 shows a front perspective view of an example carrier aligned to be docked with an example mounting dock, according to an embodiment.

In an embodiment, the release button 114 is integral to (or coupled to) the clamp 118, and the release button 116 is integral to (or coupled to) the clamp 120. As shown in FIGS. 2 and 4, the release buttons 114 and 116 extend through the cradle 102 transversely, and to opposite sides of the cradle 102. As shown in FIGS. 1, 7, and 8, in the open configuration, when the clamps 118 and 120 are extended apart, the release buttons 114 and 116 are recessed into openings in the clamps 120 and 118, respectively.

Referring to FIGS. 3, 4, 6, 9, and 10, the example mounting dock 100 is shown in a closed (or locked) configuration. The latching fins 112 are allowed to collapse inward in the closed configuration based on the position of the lock buttons 108 in the closed configuration (see FIG. 6, for example). In the closed configuration, the latching fins 112 are collapsed into the area of the cavity 110, to engage the feature (e.g., latch 702) on the carrier when it is positioned in the cavity 110. The lock buttons 108 are in the retracted position, recessed into the cradle 102.

Figure 6:
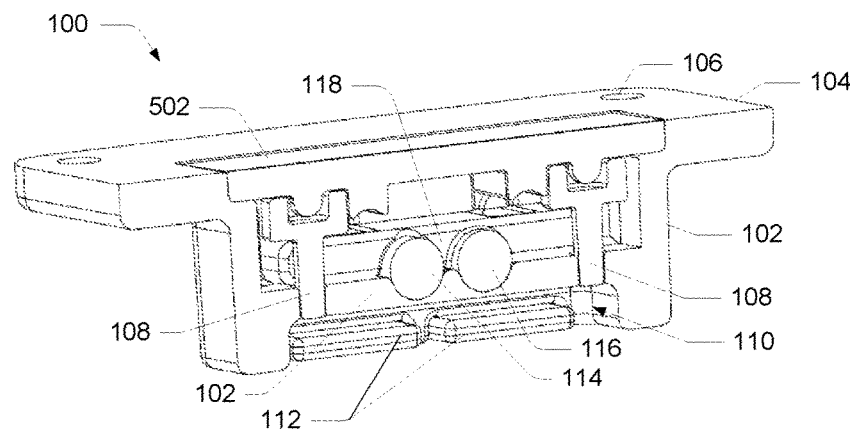
FIG. 6 shows a side section view of the example mounting dock of FIG. 1, in the locked configuration, according to an implementation.
Figure 10:
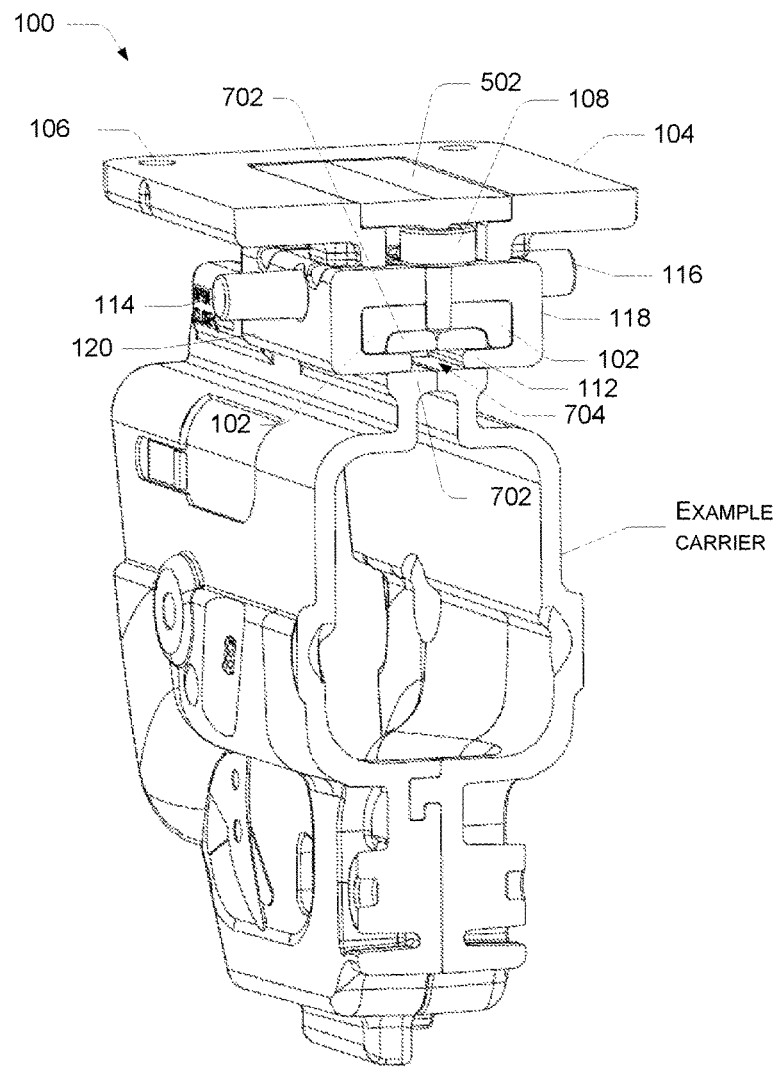
FIG. 10 shows a back perspective view of an example carrier docked to an example mounting dock, according to an embodiment.

As shown in FIGS. 4 and 6, in the closed configuration, the clamps 118 and 120 are collapsed onto the smaller diameter post portion of the lock buttons 108, and thus, the latching fins 112 are also collapsed toward the cavity 110 in the closed position. For example, in the closed position, the lock buttons 108 are pushed up into a retracted position by the carrier feature (e.g., latch 702) inserted into the cavity 110 (see FIG. 10). When in the retracted position, as shown in FIGS. 4, 6, and 10, the larger diameter portion of the lock buttons 108 is pushed above the clamps 118 and 120, allowing the spring-loaded clamps 118 and 120 to collapse inward, toward the center of the cradle 102. Since the latching fins 112 are integral to (or coupled to) the clamps 118 and 120, the latching fins 112 also move toward the center of the cavity 110.

Figure 3:
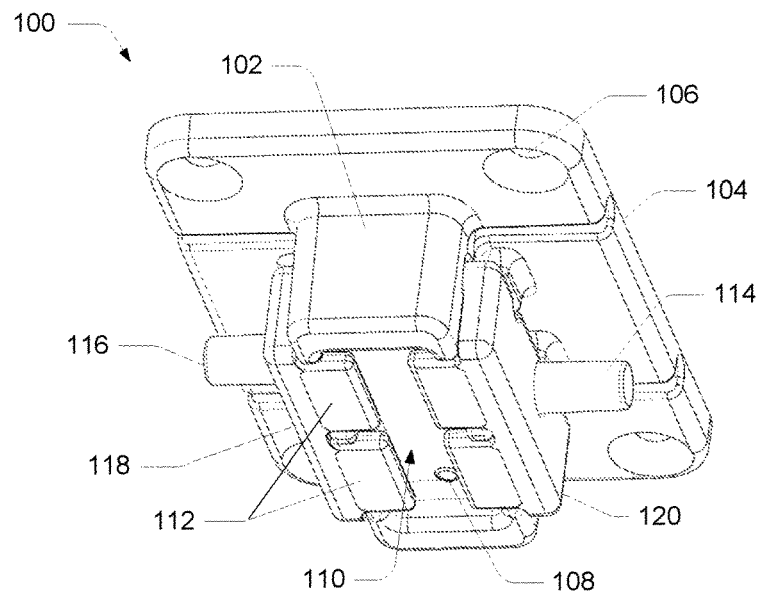
FIG. 3 shows a bottom perspective view of the example mounting dock of FIG. 1, in a locked configuration, according to an implementation.
Figure 9:
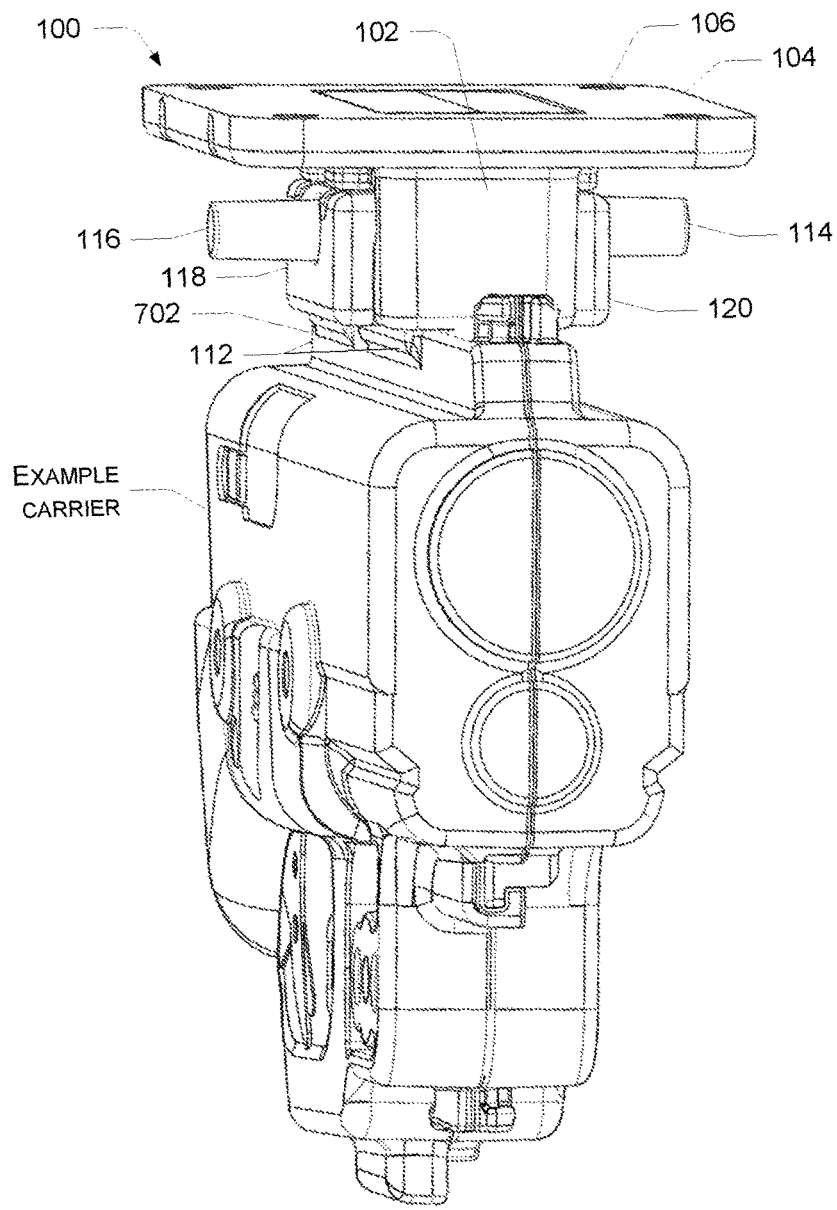
FIG. 9 shows a front perspective view of an example carrier docked to an example mounting dock, according to an embodiment.

As shown in FIGS. 2 and 4, the release buttons 114 and 116 extend through the cradle 102 transversely, and to opposite sides of the cradle 102. As shown in FIGS. 3, 9, and 10, in the closed configuration, when the clamps 118 and 120 are collapsed toward the cradle 102, the release buttons 114 and 116 are extended out of openings in the clamps 120 and 118, respectively. When the release button 114 is pressed, the release button 114 moves the clamp 118 outward, and when the release button 116 is pressed, the release button 116 moves the clamp 120 outward.

Moving the clamps 118 and 120 outward also moves the latching fins 112 outward. Also, the spring-loaded lock buttons 108 move back into the extended position when the clamps 118 and 120 are separated, making room for the larger diameter portion of the lock buttons 108. The larger diameter portion of the lock buttons 108 then holds the clamps 118 and 120 (in tension) in the open configuration.

In the extended position, the lock buttons 108 extend out of the cradle 102 and into the cavity 110, to await activation by the carrier feature (e.g., latch 702).

In an implementation, as shown in FIGS. 5, 6, 8 and 10, the dock 100 may include a cover 502 arranged to cover the interior of the cradle 102. In some embodiments, the cover 502 may also include features on the interior surface of the cover 502 to assist with alignment of one or more components of the dock 100. For example, the cover 502 may include spring guides for the lock button 108 springs, the clamp 118 and 120 springs, or the like. In alternate embodiments, the cover 502 may also include features to assist or guide the movement of one or more of the clamps 118 and 120, the release buttons 114 and 116, the lock buttons 108, and so forth.

FIGS. 7 and 8 illustrate an example carrier aligned to be docked with an example mounting dock 100, according to an embodiment. As shown in the illustrations, the feature (e.g., latch 702) of the carrier can be aligned to fit into the cavity 110 of the cradle 102. As shown, the clamps 118 and 120, as well as the latching fins 112 are extended to make room for the carrier feature (e.g., latch 702) to enter the cavity 110. The lock buttons 108 are also extended, and ready to be activated by the carrier feature (e.g., latch 702).

When activated by the carrier feature (e.g., latch 702), the lock buttons 108 recede into the cradle 102, causing the clamps 118 and 120 to collapse inward, thus causing the latching fins 112 to engage the openings 704 in the carrier feature (e.g., latch 702), which holds the carrier to the dock 100.

FIGS. 9 and 10 illustrate an example carrier docked with the example mounting dock 100, according to an embodiment. As shown in the illustrations, the feature (e.g., latch 702) of the carrier is fitted into the cavity 110 of the cradle 102. As shown, the clamps 118 and 120 are collapsed toward the cradle 102, and the latching fins 112 are collapsed into the openings 704 of the carrier feature (e.g., latch 702). The lock buttons 108 are recessed, pushed into the cradle 102 by the carrier feature (e.g., latch 702).

When the release buttons 114 and 116 are pressed, the clamps 118 and 120 move away from the cradle 102, as well as the latching fins 112, which remove from the openings 704 in the carrier feature (e.g., latch 702), releasing the carrier feature (e.g., latch 702) from the cradle 102. The spring-loaded lock buttons 108 extend into the cavity 110, and the larger diameter portion of the lock buttons 108 moves between the clamps 118 and 120, holding them apart.

In various implementations, components of the dock 100 are comprised of various plastics, composites, metals, combinations of the same, or the like. For example, the cradle 102 and/or the base 104 may be comprised of a polyamide, or similar material. For example, the dock 100 components may be injection molded, stamped, formed, or the like. In various embodiments, the dock 100 components have rigidity and stability properties based on a particular material selected for the dock 100 components. For example, some materials that may be used include styrenic block copolymers (TPE-s), polyolefin blends (TPE-o), elastomeric alloys (TPE-v or TPV), thermoplastic polyurethanes (TPU), Thermoplastic copolyesters, thermoplastic polyamides, various metals and alloys, fiber composites, combinations of the same, and the like. Additionally, in some embodiments, the stability properties are also based on a thickness of the dock 100 components.

In various implementations, the mounting dock 100 may include fewer, more, or alternate components, and remain within the scope of the disclosure. In various embodiments, the shape and configuration of the dock 100 components may vary to accommodate different implements or applications. In an example, the cradle 102 and/or cavity 110 may be formed to closely fit a particular implement. In other examples, the cradle 102 and/or cavity 110 may be more generally formed to fit multiple implements. For instance, carriers may include different carrier feature (e.g., latch 702) designs, shapes, and sizes.

The illustrations of FIGS. 1-10 are not intended to be limiting. In the various example embodiments illustrated in FIGS. 1-10, the location and position of the components, locking mechanisms, and the like are for example only. Other locations and positions are contemplated and are within the scope of this disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a dock 100 may be implemented as a stand-alone device or as part of another system (e.g., integrated with other components). In various implementations, additional or alternative components may be used to accomplish the disclosed techniques and arrangements.

While a carrier in the form of a handgun holster is illustrated, various other types of implements, implement holsters, cases, containers, and the like are also within the scope of the disclosure, and intended to be mounted to the dock 100. Further, the design of the dock 100 as well as the design of the various attachment devices may vary. Other attachment devices and techniques are also within the scope of the disclosure.

Although various implementations and examples are discussed herein, further implementations and examples may be possible by combining the features and elements of individual implementations and examples.

CONCLUSION

Although the implementations of the disclosure have been described in language specific to structural features and/or methodological acts, it is to be understood that the implementations are not necessarily limited to the specific features or acts described.

What is claimed is:

1. A mounting dock for a carrier, comprising:
   a cradle arranged to receive and to support the carrier;
   one or more spring-loaded lock buttons disposed within the cradle and arranged to be activated when the carrier is pressed into the cradle;
   one or more spring-loaded latching fins movably coupled to the cradle and arranged to catch the carrier when the carrier is pressed into the cradle and the one or more lock buttons are activated;
   one or more release buttons coupled to the latching fins and arranged to move the latching fins and to release the carrier, when activated; and
   a pair of clamps movably coupled to the cradle, the clamps integral to or coupled to the one or more latching fins and the one or more release buttons,
   wherein the one or more lock buttons is disposed between the pair of clamps, is in contact with both of the said clamps, and holds the said clamps apart.

2. The mounting dock of claim 1, further comprising a base integral to or coupled to the cradle and arranged to temporarily or permanently attach the cradle to a desired surface, the base including one or more mounting holes.

3. The mounting dock of claim 1, further comprising a cavity within the cradle, the cavity arranged to receive a portion of the carrier, and wherein the one or more lock buttons extend through one or more openings in the cradle and protrude partly into the cavity, and are arranged to be activated when the portion of the carrier is pressed into the cavity.

4. The mounting dock of claim 3, wherein the one or more lock buttons are recessed into the one or more openings in the cradle when activated, and wherein the one or more latching fins are arranged to move toward the carrier when the portion of the carrier is pressed into the cavity and the one or more lock buttons are activated, a distance based on a diameter of a lower portion of the one or more spring-loaded lock buttons.

5. The mounting dock of claim 1, wherein the one or more spring-loaded lock buttons are arranged to cause the clamps to be extended from the cradle when the one or more lock buttons are at rest and to cause the clamps to be retracted toward the cradle when the one or more lock buttons are activated.

6. The mounting dock of claim 5, wherein the one or more latching fins are configured to be opened when the clamps are extended from the cradle and to be closed onto the carrier when the clamps are retracted toward the cradle.

7. The mounting dock of claim 1, wherein the one or more release buttons are arranged to cause the clamps to be extended from the cradle when the one or more release buttons are activated and to allow the clamps to be retracted toward the cradle when the one or more release buttons are at rest.

8. The mounting dock of claim 1, wherein the one or more lock buttons are configured to include a top portion with a larger diameter than a diameter of a lower portion of the one or more lock buttons.

9. The mounting dock of claim 8, wherein the top portion of the one or more lock buttons is disposed between the pair of clamps when the one or more lock buttons is at rest, and wherein the pair of clamps is arranged to hold the one or more latching fins in an open configuration when the top portion of the one or more lock buttons is disposed between the pair of clamps.

10. The mounting dock of claim 9, wherein the lower portion of the one or more lock buttons is disposed between the pair of clamps when the one or more lock buttons is activated, and wherein the pair of clamps is arranged to hold the one or more latching fins in a closed configuration when the lower portion of the one or more lock buttons is disposed between the pair of clamps.

11. The mounting dock of claim 9, wherein the one or more release buttons are arranged to extend transversely through one or more clamps of the pair of clamps.

12. The mounting dock of claim 1, wherein the one or more latching fins are adapted to enter into one or more recesses of the carrier when the one or more lock buttons are activated and to trap the carrier within the cradle.

13. The mounting dock of claim 1, wherein the mounting dock comprises a dock for a handgun holster, and wherein the one or more spring-loaded latching fins are arranged to trap a latch device disposed on a surface of the holster.

14. A holster dock assembly arranged to support a holster, the holster dock assembly comprising:
   a cradle cavity adapted to accept a latch component disposed on an outer surface of the holster;
   one or more spring-loaded lock buttons disposed in the cradle cavity and arranged to activate one or more spring-loaded latching fins when the latch component is pressed into the cradle cavity, the latching fins adapted to enter into one or more recesses of the latch component when activated and to trap the latch component within the cradle cavity;
   one or more release buttons arranged to push the latching fins open and to release the latch component, when pressed; and
   a pair of clamps movably coupled to the cradle, the clamps integral to or coupled to the one or more latching fins and the one or more release buttons,
   wherein the one or more lock buttons is disposed between the pair of clamps, is in contact with each of the said clamps, and holds the said clamps apart.

15. The holster dock assembly of claim 14, wherein the or mom clamps are arranged to be held in an open position by the one or more lock buttons when the one or more lock buttons are at rest, and wherein the clamps are arranged to be released to move inward to a closed position when the one or more lock buttons are activated.

16. A mounting dock for a carrier, comprising:
   a cradle arranged to support the carrier, including a cavity within the cradle arranged to receive the carrier;
   one or more spring-loaded lock buttons disposed within the cavity and arranged to be activated when a portion of the carrier is pressed into the cavity;
   one or more spring-loaded latching fins movably coupled to the cradle and arranged to catch the portion of the carrier when the one or more lock buttons are activated;
   one or more release buttons coupled to the latching fins and arranged to move the latching fins and to release the portion of the carrier, when activated;
   a pair of clamps movably coupled to the cradle, the clamps integral to or coupled to the one or more latching fins and the one or more release buttons, wherein the one or more lock buttons is disposed between the pair of clamps, is in contact with each of the said clamps, and holds the said clamps apart; and
   a base integral to or coupled to the cradle and arranged to temporarily or permanently attach the cradle to a desired surface.

17. The mounting dock of claim 16, wherein the mounting dock is configured to be mounted to a wall, to an item of furniture, or to a portion of a vehicle.

18. The mounting dock of claim 16, wherein the cradle is arranged to support a holster for a firearm.

* * * * *